United States Patent
Kuroki et al.

(10) Patent No.: US 11,428,804 B2
(45) Date of Patent: Aug. 30, 2022

(54) VEHICLE DETECTION SYSTEM AND METHOD

(71) Applicants: DENSO CORPORATION, Kariya (JP); TOYOTA JIDOSHA KABUSHIKI KAISHA, Toyota (JP)

(72) Inventors: Michihiro Kuroki, Kariya (JP); Mitsuhiro Tokimasa, Kariya (JP); Hiroshi Yamada, Nisshin (JP); Naoki Kusumoto, Okazaki (JP)

(73) Assignees: DENSO CORPORATION, Kariya (JP); TOYOTA JIDOSHA KABUSHIKI KAISHA, Toyota (JP)

(*) Notice: Subject to any disclaimer, the term of this patent is extended or adjusted under 35 U.S.C. 154(b) by 228 days.

(21) Appl. No.: 16/782,515

(22) Filed: Feb. 5, 2020

(65) Prior Publication Data

US 2020/0256981 A1 Aug. 13, 2020

(30) Foreign Application Priority Data

Feb. 7, 2019 (JP) .............................. JP2019-020662

(51) Int. Cl.
*G01S 13/931* (2020.01)
*G08G 1/052* (2006.01)

(52) U.S. Cl.
CPC ..... *G01S 13/931* (2013.01); *G01S 2013/9322* (2020.01); *G01S 2013/9325* (2013.01); *G08G 1/052* (2013.01)

(58) Field of Classification Search
CPC ................. G01S 13/931; G01S 13/86–13/867
See application file for complete search history.

(56) References Cited

U.S. PATENT DOCUMENTS

| | | | | |
|---|---|---|---|---|
| 6,492,935 | B1 * | 12/2002 | Higuchi ................ | G01S 13/931 342/70 |
| 6,590,521 | B1 * | 7/2003 | Saka ..................... | G01S 13/867 342/70 |
| 6,941,211 | B1 * | 9/2005 | Kuroda ................. | G01S 13/867 701/70 |
| 9,390,624 | B2 * | 7/2016 | Minemura ............ | G01S 13/867 |
| 10,641,888 | B2 * | 5/2020 | Fetterman ............ | G01S 13/931 |

(Continued)

FOREIGN PATENT DOCUMENTS

| JP | 2008-008870 A | 1/2008 |
|---|---|---|
| JP | 2016-020118 A | 2/2016 |
| WO | 2014/038076 A1 | 3/2014 |

*Primary Examiner* — Peter M Bythrow

(74) *Attorney, Agent, or Firm* — Maschoff Brennan

(57) ABSTRACT

To provide a vehicle detection system capable of detecting a preceding vehicle traveling ahead of an own vehicle based on a position of an object by using an electromagnetic wave sensor while suppressing erroneous detection, an ECU determines if first and second positions detected by a millimeter wave radar are included in the same vehicle. The ECU designates calculated information of the preceding vehicle detected based on the first position as a calculation result if it determines that detection of the preceding vehicle is made based on the first position. The ECU uses calculated information of the preceding vehicle detected based on the second position as the calculation result when it determines that detection of the vehicle is not made based on the first position but the first and the second positions had been determined in the past as detected in the same vehicle.

8 Claims, 6 Drawing Sheets

(56) References Cited

U.S. PATENT DOCUMENTS

| | | | | |
|---|---|---|---|---|
| 10,866,316 B2* | 12/2020 | Takaki | | G01S 13/931 |
| 10,889,271 B2* | 1/2021 | Pink | | G06F 16/909 |
| 2006/0125679 A1* | 6/2006 | Horibe | | G01S 13/867 |
| | | | | 342/52 |
| 2007/0080850 A1* | 4/2007 | Abe | | G01S 13/867 |
| | | | | 342/52 |
| 2008/0088707 A1* | 4/2008 | Iwaki | | G01S 13/931 |
| | | | | 348/208.1 |
| 2009/0040094 A1* | 2/2009 | Harada | | G01S 13/931 |
| | | | | 342/59 |
| 2009/0135065 A1* | 5/2009 | Tsuchida | | G01S 17/931 |
| | | | | 342/454 |
| 2009/0251355 A1* | 10/2009 | Nanami | | G01S 13/867 |
| | | | | 342/27 |
| 2010/0085238 A1* | 4/2010 | Muller-Frahm | | G01S 13/931 |
| | | | | 342/70 |
| 2011/0050482 A1* | 3/2011 | Nanami | | G01S 13/931 |
| | | | | 342/52 |
| 2013/0236047 A1* | 9/2013 | Zeng | | G06T 1/0007 |
| | | | | 382/103 |
| 2014/0139369 A1* | 5/2014 | Baba | | G01S 13/931 |
| | | | | 342/146 |
| 2014/0297171 A1* | 10/2014 | Minemura | | B60R 21/34 |
| | | | | 701/301 |
| 2015/0054673 A1* | 2/2015 | Baba | | G01S 13/867 |
| | | | | 342/27 |
| 2015/0066348 A1* | 3/2015 | Baba | | G08G 1/166 |
| | | | | 701/301 |
| 2015/0175162 A1 | 6/2015 | Nakadori | | |
| 2016/0009280 A1 | 1/2016 | Tokimasa et al. | | |
| 2016/0107643 A1* | 4/2016 | Mizutani | | G01S 13/931 |
| | | | | 701/519 |
| 2016/0207533 A1* | 7/2016 | Uechi | | G08G 1/166 |
| 2017/0080929 A1* | 3/2017 | Sawamoto | | B60W 30/0956 |
| 2017/0315224 A1* | 11/2017 | Mizutani | | G01S 7/352 |
| 2017/0330033 A1* | 11/2017 | Tokimasa | | G01S 13/867 |
| 2018/0178811 A1* | 6/2018 | Ohta | | B60R 1/00 |
| 2019/0092330 A1* | 3/2019 | Ide | | G01S 13/931 |

* cited by examiner

DISPLACEMENT

FIG.7A
FIG.7B
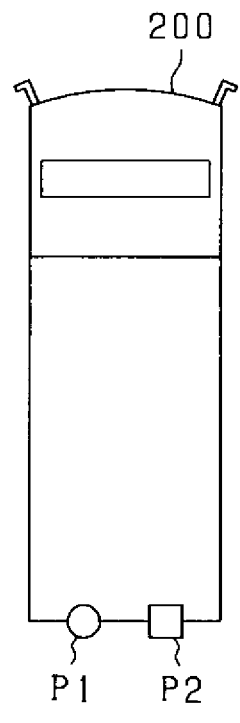
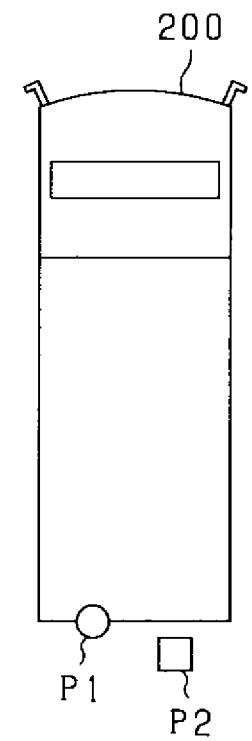

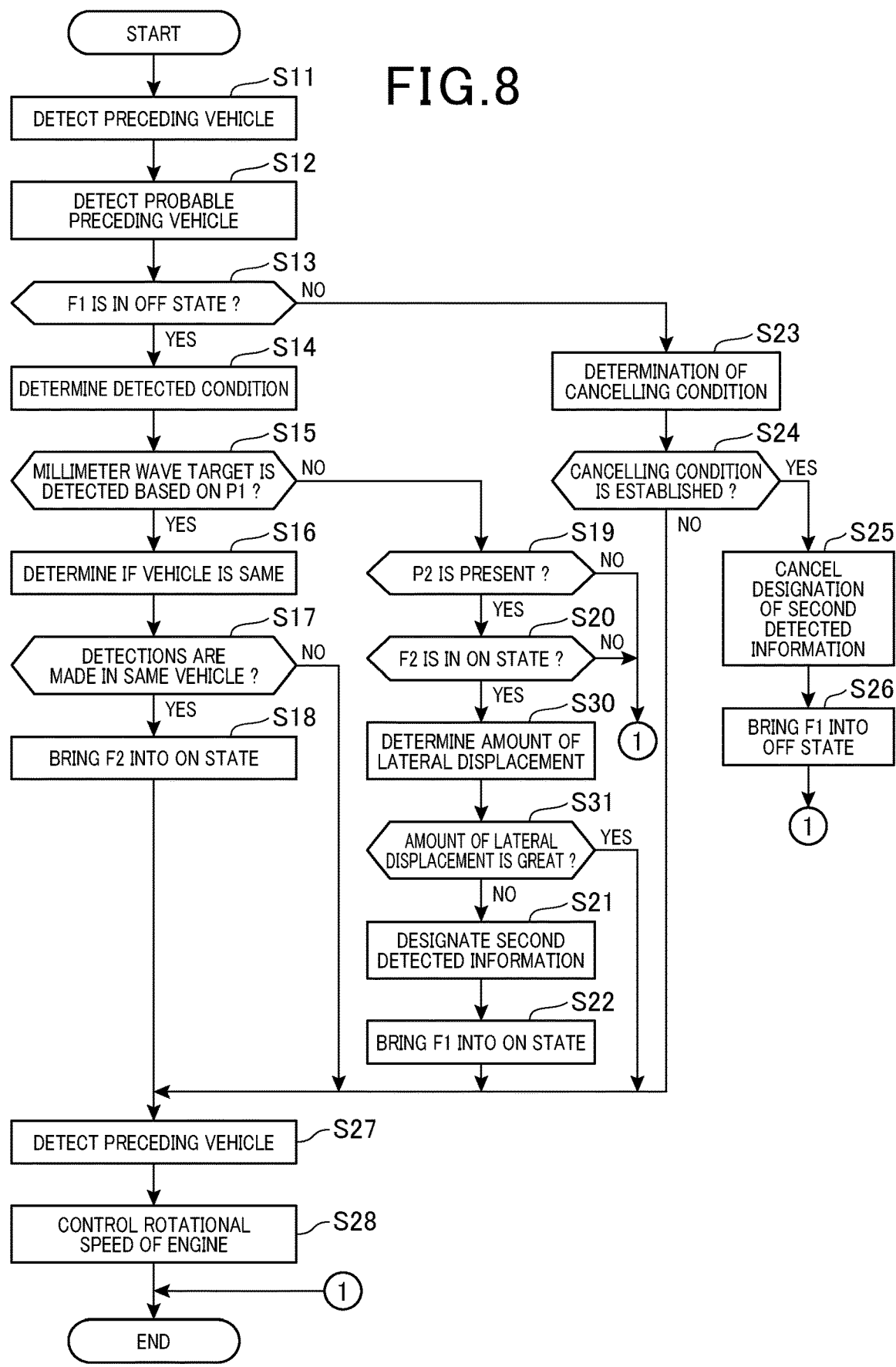

VEHICLE DETECTION SYSTEM AND METHOD

CROSS-REFERENCE TO RELATED APPLICATION

This patent application is based on and claims priority to Japanese Patent Application No. 2019-020662, filed on Feb. 7, 2019 in the Japan Patent Office, the entire disclosure of which is hereby incorporated by reference herein.

BACKGROUND

Technical Field

The present disclosure relates to a vehicle detection system and method for detecting a vehicle traveling ahead of an own vehicle, based on a position of an object detected by an electromagnetic wave sensor.

Related Art

A known vehicle detection system detects a vehicle traveling ahead of an own vehicle based on a position of an object detected by a millimeter wave radar. Such a conventional vehicle detection system continuously detects the vehicle if the vehicle detection system had previously detected the vehicle by receiving sufficiently intensive light therefrom even if received millimeter wave radar signals are currently weakening.

However, when it continuously detects the vehicle using an electromagnetic wave sensor based on a position generating a signal of low reliability, the vehicle detection system is likely to erroneously detect the vehicle. For example, when a road side object or the like reflecting the millimeter wave is present around the vehicle and is detected by the electromagnetic wave sensor, the vehicle detection system sometimes erroneously determines a position of the road side object as the position of a vehicle.

Accordingly, the present disclosure addresses the above-described problem and it is an object to provide a vehicle detection system capable of detecting a vehicle traveling ahead of an own vehicle based on the position of an object detected by an electromagnetic wave sensor, while suppressing erroneous detection of vehicles.

SUMMARY

One aspect of the present disclosure provides a novel vehicle detection system for detecting a preceding vehicle traveling ahead of an own vehicle based on a position of an object. The vehicle detection system includes an electromagnetic wave sensor to detect first and second positions in an object. The first position has high reliability as a position of the object to be observed. The second position has lower reliability than the first position as a position of the object to be observed. The vehicle detection system further includes a same vehicle determiner to determine if the first and second positions are included in the same vehicle. The vehicle detection system also includes a first position detection determiner to determine if detection of the preceding vehicle is made based on the first position. The vehicle detection system further includes a calculated information designator to designate a first calculated information at least including one of a relative speed, a relative distance and a lateral position of a preceding vehicle detected based on the first position. The first calculated information is calculated relative to the own vehicle and utilized by the same vehicle determiner. The calculated information designator continuously designates a second calculated information at least including one of a relative speed, a relative distance and a lateral position of the preceding vehicle detected based on the second position when detection of the preceding vehicle is currently not made based on the first position but the first and second positions had been previously detected in the same preceding vehicle during a previous control cycle. The second calculated information is calculated relative to the own vehicle and utilized by the same vehicle determiner.

Another aspect of the present disclosure provides a novel method of detecting a preceding vehicle traveling ahead of an own vehicle based on a position of an object, including a vehicle. The method includes the step of detecting first and second positions in an object. The first position has a high reliability as a position of the object to be observed. The second position has a lower reliability than the first position as a position of the object to be observed. The method further includes the step of calculating one of a relative speed, a relative distance and a lateral position of the preceding vehicle relative to the own vehicle when the detection of the preceding vehicle is made based on the first position. The method further includes the step of designating a first calculated information at least including one of the relative speed, the relative distance and the lateral position of the preceding vehicle. The method further includes the step of calculating one of a relative speed, a relative distance and a lateral position of the preceding vehicle relative to the own vehicle when the detection of the preceding vehicle is made based on the second position. The method further includes the step of continuously designating a second calculated information at least including one of the relative speed, the relative distance and the lateral position of the preceding vehicle when detection of the preceding vehicle is currently not made based on the first position but the first and second positions had been previously detected in the same preceding vehicle during a previous control cycle. The method further includes the step of determining if the first and second positions are included in the same vehicle based on at least one of the first and the second calculated information.

With the above-described configuration, when it is determined that detection of the vehicle is made based on the first position having a higher reliability as an observation target than the second position, the calculated information of the vehicle detected based on the first position is designated as the calculation result. By contrast, when it is determined that detection of the vehicle is not made based on the first position, calculated information of the vehicle detected based on the second position having lower reliability as an observation target is designated as the calculation result, if the first position and the second position are determined to be detected in the same vehicle. Hence, even when detection of the vehicle is not made based on the first position having the higher reliability as the observation target, erroneous detection of the vehicle can be suppressed. Because, detection of the vehicle is continued based on the calculated information of the vehicle detected based on the second position when the second position had been detected in the past in the vehicle in which the first position is also detected.

BRIEF DESCRIPTION OF THE DRAWINGS

A more complete appreciation of the present disclosure and many of the attendant advantages of the present disclosure will be more readily obtained as substantially the same becomes better understood by reference to the following detailed description when considered in connection with the accompanying drawings, wherein:

FIGS. 7A and 7B are diagrams collectively illustrating a necessary condition for cancelling designation of second calculated information according to a second embodiment of the present disclosure; and FIG. 8 is a flowchart illustrating an exemplary sequence of ACC control executed according to a third embodiment of the present disclosure.

DETAILED DESCRIPTION

Figure 1:
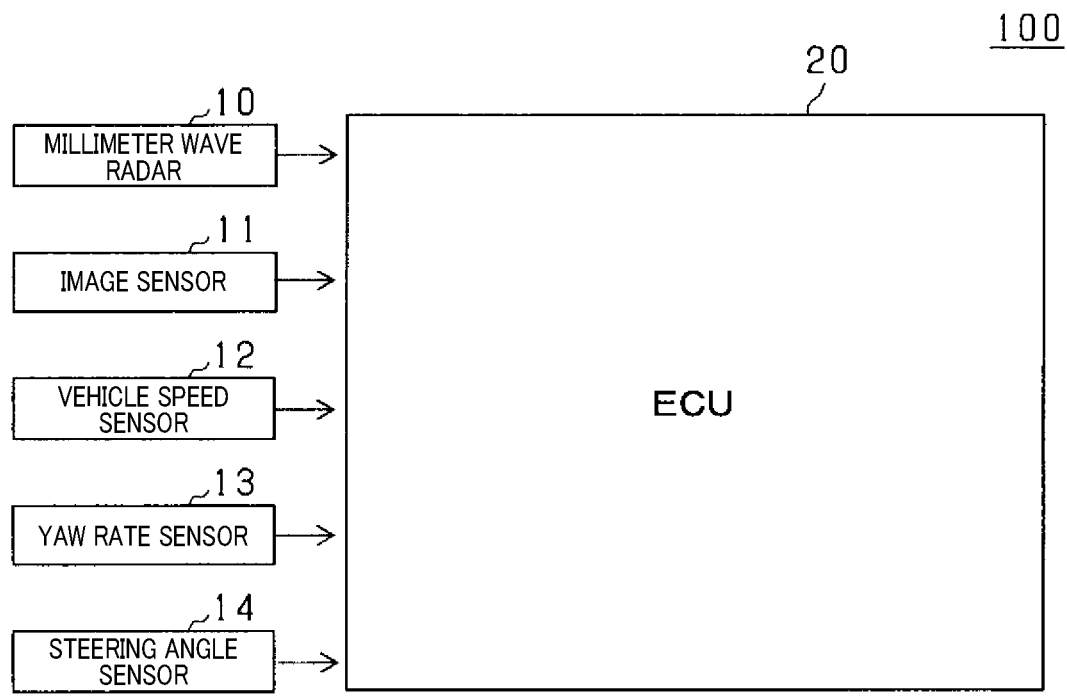
FIG. 1 is a diagram illustrating an exemplary configuration of a drive assistance system according to one embodiment of the present disclosure.

A known vehicle detection system described in Japanese Patent Application Publication No. 2008-008870 (JP-2008-008870) detects a vehicle traveling ahead of an own vehicle based on a position of an object detected by a millimeter wave radar. Such a vehicle detection system continuously detects the vehicle if the vehicle detection system had previously detected the vehicle by receiving sufficiently intensive light therefrom even if received millimeter wave radar signals are currently weakening. Hence, the earlier described inconvenience occurs and needs to be resolved.

Referring now to the drawings, wherein like reference numerals designate identical or corresponding parts throughout the several views thereof, and to FIG. 1, a drive assistance system according to the first embodiment is hereinbelow described. A drive assistance system is mounted on a vehicle and performs ACC (Adaptive Cruise Control) to maintain a distance between own and preceding vehicles to be a target value corresponding to a vehicle speed.

The drive assistance system 100 shown in FIG. 1 includes a millimeter wave radar 10 acting as an electromagnetic wave sensor, an image sensor 11, and an ECU (Electronic Control Unit) 20 acting as a vehicle detection system.

The millimeter wave radar 10 is composed of a known radar that outputs a transmission wave in a millimeter wave band as a high-frequency signal. The millimeter wave radar 10 is disposed at a front end of an own vehicle. The millimeter wave radar 10 has a detectable range of a prescribed angle formed with respect to the own vehicle and detects objects in the detectable range. More specifically, the millimeter wave radar 10 transmits a probing wave in a prescribed cycle and receives reflected waves via multiple antennas. Then, a relative distance from the own vehicle to a target on a XY plane extending horizontally is calculated based on a transmission time of the probing wave and a reception time of the reflected wave. Also, the millimeter wave radar 10 calculates an azimuth of the object on the XY plane based on differences in phase between the reflected waves received by the multiple antennas. Here, the XY plane is defined by an X-axis extended in a widthwise direction of the own vehicle. The XY plane is also defined by a Y-axis extended in a traveling direction of the own vehicle. Hence, the millimeter wave radar 10 detects the relative distance and an azimuth of the object as a calculated position.

Herein below, an object with its position detected by the millimeter wave radar 10 is referred to as a millimeter wave target. The millimeter wave radar 10 further calculates a speed of a millimeter wave target relative to the own vehicle based on a change in frequency caused by the Doppler effect between reflected waves from the millimeter wave target. Further, based on the position of the millimeter wave target, the millimeter wave radar 10 calculates a lateral position of the object relative to the own vehicle in the vehicle widthwise direction. In this embodiment, the relative distance, the relative speed and the lateral position calculated in accordance with the position of the millimeter wave target collectively correspond to calculated information.

Further, the millimeter wave radar 10 detects a position of an object using first and the second detection methods respectively employing different receivable lower limits of signal intensities of reflected waves from each other. Specifically, as the first detection method, the millimeter wave radar 10 detects a position where the received signal intensity of a reflected wave therefrom exceeds a first threshold as a first position P1. As the second detection method, the millimeter wave radar 10 detects a position where the received signal intensity of a reflected wave therefrom exceeds a second threshold value which is less than the first threshold as a second position P2. For example, the first detection method is performed by a FMCW (Frequency-modulated continuous-wave) system. The second detection method is performed by an FCM (Fast-Chirp Modulation) system.

The image sensor 11 is attached at a prescribed height at a widthwise center of the own vehicle and detects a position of an object located ahead of the own vehicle. Specifically, the image sensor 11 captures an image of a region spreading ahead of the own vehicle with a prescribed angle. The image sensor 11 then subjects a captured image to pattern matching with a prescribed target template based on a luminance in the captured image. Based on this pattern matching, the image sensor 11 recognizes a portion of the captured image having luminance information matching with the target template as an object corresponding to the target template. The image sensor 11 calculates a center of the recognized object in the X-axis direction as a position of the object in the X-axis direction. Further, since a width of the object in the captured image in the X-axis direction is increasingly widely imaged as the object is located closer to the image sensor 11, the image sensor 11 calculates a Y coordinate of the object based on the width of the object. Then, based on the coordinates X and Y of the calculated object, the image sensor 11 further calculates a relative distance from the own vehicle to the object and an azimuth of the object with reference to the own vehicle as a detection position. Herein below, an object with its position detected by the image sensor 11 is referred to as an image target.

Further, the drive assistance system 100 includes a vehicle speed sensor 12 for detecting a vehicle speed, a yaw rate sensor 13 for detecting a yaw rate of a vehicle and a steering angle sensor 14 for detecting a steering angle of steering wheels. Each of the sensors 12, 13, and 14 is connected to the ECU 20, so that signals detected by the sensors 12, 13, and 14 are input to the ECU 20.

The ECU 20 includes a microprocessor for performing calculation, a ROM (Random Access Memory) for storing program or the like letting the microprocessor execute processes and a RAM (Random Access Memory) for storing various data such as calculation results.

The ECU 20 determines if each of the millimeter wave target and the image target belong to the same object (hereinafter, referred to as same object determination). Specifically, the ECU 20 determines whether each of the millimeter wave target and the image target belongs to the same object as each other based on a presence of an overlap between a millimeter wave search region determined based on a position of the millimeter wave target and an image search region determined based on a position of the image target. That is, when it determines that there is the overlapping region between the millimeter wave search region and the image search region, the ECU 20 further determines that the millimeter wave target and the image target are the same object. By contrast, when it determines that there is no overlapping region between the millimeter wave search region and the image search region, the ECU 20 determines that the millimeter wave target and the image target belong to different objects.

Further, the ECU 20 fuses the calculated information calculated based on the position of the millimeter wave target and calculated information calculated based on a position of the image target when the ECU 20 determines that the targets belong to the same object. Here, although it highly accurately detects a relative distance and a relative speed relative to an own vehicle, the millimeter wave radar 10 cannot detect lateral displacement more accurately than the image sensor 11. By contrast, although it can highly accurately detect the lateral displacement, the image sensor 11 is inferior to the millimeter wave radar 10 in accuracy of detecting the distance and the speed relative to the own vehicle. Hence, among the calculated information of the image sensor 11 and the millimeter wave radar 10, information having higher detection accuracy are fused. Hereinafter, a target determined as belonging to the same object is referred to as a fusion target. Here, the ECU 20 assigns a type of the image detected by the image sensor 11 to the fusion target.

Further, the ECU 20 recognizes a vehicle traveling ahead in its own lane as a preceding vehicle among the fusion targets. Specifically, the ECU 20 estimates a course of the own vehicle based on a vehicle speed signal transmitted from the vehicle speed sensor 12, a yaw rate signal transmitted from the yaw rate sensor 13 and a running state of the own vehicle calculated based on a steering angle signal transmitted from the steering angle sensor 14. Then, the ECU 20 Compares the estimated result of the course of the own vehicle with the position of the vehicle and detects (i.e., recognizes) the vehicle as a preceding vehicle when the vehicle is present in front of the own vehicle in the course. Here, when estimating the course of the own vehicle, white line information detected by the image sensor 11 or the like can be utilized.

Further, to equalize the relative distance between a rear end of the preceding vehicle and the own vehicle with a target vehicle distance, the ECU 20 transmits a control command to an engine and a brake system to control each of the devices. The target value of the vehicle distance between the vehicles varies depending on a speed of the own vehicle.

At this moment, a driver can change a lane by steering. In such a situation, however, as in a situation of automatic steering, a control command is transmitted to the engine and the brake system to equalize the relative distance between the own vehicle having changed the traffic lane and the preceding vehicle with the target distance to be maintained between the vehicles. Here, if there is no preceding vehicle in the lane of the own vehicle, the ECU 20 can control a traveling speed based on a traveling speed set by the driver and a speed limit designated for a road where the own vehicle travels or the like.

Further, if it cannot detect a millimeter wave target based on the first position P1, the ECU 20 detects a millimeter wave target having a second position P2. Here, when it continuously detects the millimeter wave target based on the second position P2 and a road side object such as a manhole or the like reflecting millimeter waves is present around the millimeter wave target, the ECU 20 is likely to erroneously detect the second position P2 as a preceding vehicle based on the millimeter wave reflected from the roadside object. Further, when intensity of a received signal of a millimeter wave from a forward portion of a preceding vehicle rather than a rear end thereof is greater than that from the rear end, such a forward portion is likely to be detected as a position of the millimeter wave target. Thus, in such a situation, even if the same preceding vehicle is detected as the millimeter wave target, the second position P2 is different (i.e., erroneous).

Further, when the ECU 20 determines that detection of a millimeter wave target is not made based on the first position P1, the ECU 20 continuously perform detection of the millimeter wave target based on the second position P2 with less reliability than the first position P1 in place of the first position P1 if the ECU 20 determines that the first position P1 and the second position had been detected in the same vehicle (i.e., the millimeter wave target) in the past (i.e., during a previous control cycle).

Now, various functions of the ECU 20 are described herein below with reference to FIG. 2 and applicable drawings.

Figure 2A:
FIGS. 2A and 2B are diagrams collectively illustrating a situation where first and second positions are detected and are determined as to whether they belong to the same preceding vehicle according to one embodiment of the present disclosure.
Figure 2B:
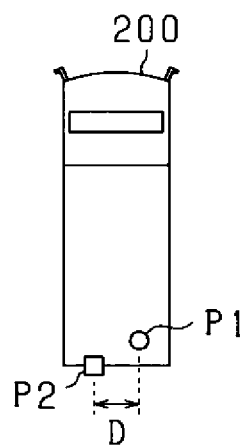

First, the ECU 20 determines whether the first position P1 and the second position P2 belong to the same vehicle. For example, FIGS. 2A and 2B collectively illustrate a situation where a truck (i.e., a vehicle) 200 provided with a loading platform at a front side thereof travels ahead of the own vehicle 101. Here, FIG. 2A is a side view illustrating the own vehicle 101 and the preceding vehicle 200. FIG. 2B is a plan view illustrating the preceding vehicle 200.

When the millimeter wave radar 10 detects the first and second positions P1 and P2 in the same vehicle, a difference in each of distance and speed between the first and second positions P1 and P2 is less than that when the millimeter wave radar 10 detects the first and second positions P1 and P2 in different objects, respectively. Hence, in this embodiment, when all of the below described five conditions are satisfied, the ECU 20 determines that the first position P1 and the second position P2 are detected in the same vehicle (i.e., the millimeter wave target). First, a difference D in distance between the first position P1 and the second position P2 is smaller than a prescribed distance difference threshold (i.e., a determination distance difference). Secondly, a difference in moving speed between the first position P1 and the second position P2 is smaller than a prescribed speed difference threshold (i.e., a determination speed difference). Thirdly, a fusion target obtained by fusing a millimeter wave target detected based on the first position P1 and an image target together has been recognized in the past as a preceding vehicle. Fourthly, an own vehicle speed detected by the vehicle speed sensor 12 is greater than a prescribed threshold (i.e., a prescribed running speed). Fifthly, these four conditions continue for a prescribed period of time.

Here, the determination distance difference is the maximum value of a difference in distance between the first position P1 and the second position P2 assumed when the first position P1 and the second position P2 are detected in the same vehicle. The determination speed difference is the maximum value of a difference in moving) speed between the first position P1 and the second position P2 assumed when the first position P1 and the second position P2 are detected in the same vehicle. The prescribed running speed is the minimum value of a speed assumed when an own vehicle does not stop. Further, the prescribed period of time may be from several seconds or more to several tens of seconds or less. In this embodiment, the ECU 20 corresponds to a same vehicle determiner.

Hence, the ECU 20 determines whether it is detecting a millimeter wave target based on the first position P1. Specifically, in this embodiment, the ECU 20 determines that it is detecting the millimeter wave target based on the first position P1 when the millimeter wave radar 10 detects the first position P1 generating a received signal having intensity of a first threshold or more and a so-called distance jump described below is absent in the first position P1 as detected. The distance jump is a phenomenon in which the first position P1 moves by an amount of observation distance (i.e., an amount of observation movement) different from an assumed amount of observation distance by which the first position P1 detected in the preceding vehicle is assumed to move in a first period. Further, the first period is sufficient if it enables observation of the distance jump of the first position P1 and may be several tens of seconds or less. Hence, in this embodiment, the ECU 20 corresponds to a first position detection determiner.

Figure 3:
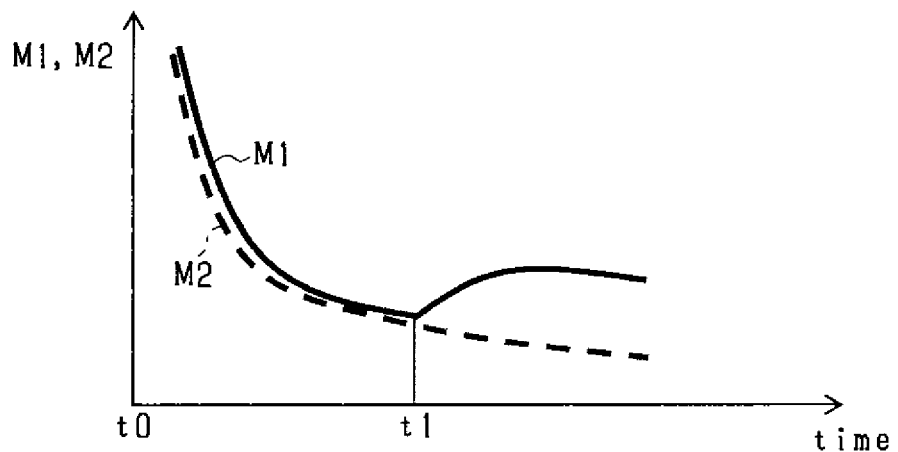
FIG. 3 is a diagram illustrating a change in first position causing a so-called distance jump according to one embodiment of the present disclosure.
Figure 4A:
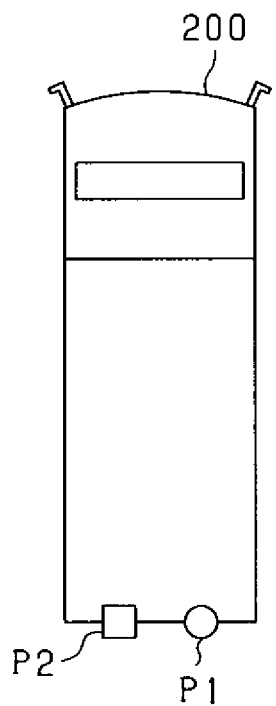
FIGS. 4A and 4B are diagrams collectively illustrating a principle of the distance jump of the first position according to one embodiment of the present disclosure.
Figure 4B:
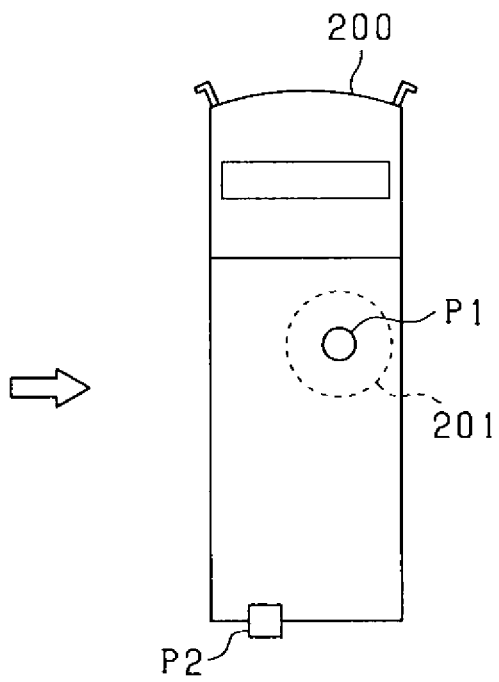

Specifically, FIG. 3 illustrates a relation between observation distances M1 and M2 of the first and the second positions P1 and P2, respectively, and elapse of time, when a speed of a preceding vehicle decreases relative to the own vehicle, wherein a vertical axis indicates the observation distances M1 and M2 of the first and the second positions P1 and P2, respectively, and a horizontal axis indicates the elapse of time. FIGS. 4A and 4B are plan views collectively illustrating the preceding vehicle 200 (e.g., a truck), wherein time elapses from a time of FIG. 4A to that of FIG. 4B in this order.

As shown, when the first and second positions P1 and P2 are detected in the same preceding vehicle, each of the respective observed distances M1 and M2 of the first and second positions P1 and P2 corresponds to a change in speed of the preceding vehicle 200 relative to the own vehicle. However, as shown in FIG. 3, at a time t1, due to occurrence of the so-called distance jump of the first position P1, the observation distance M1 of the first position P1 increases to be longer than the observation distance M2 of the second position P2 so that the first position P1 recedes further away from the own vehicle than the second position P2 in a direction.

Now, a principle of occurrence of the distance jump is described with reference to FIGS. 4A and 4B. As shown, when the preceding vehicle 200 is a truck including a loading platform, since a rear end serving as a reflective surface for an electromagnetic wave is generally narrow, reflection intensity of an electromagnetic wave is sometimes weak. Further, due to presence of a manhole 201 below the preceding vehicle 200 as a stationary object, since reflection intensity of an electromagnetic wave reflected by the manhole 201 is stronger than the reflection intensity of the electromagnetic wave reflected by the rear end of the preceding vehicle 200, the millimeter wave radar 10 may erroneously detect the manhole 201 as the first position P1. Furthermore, the millimeter wave radar 10 currently detecting a rear end of a preceding vehicle as a first position P1 sometimes happens to detect a forward portion of the vehicle as the first position P1 rather than the rear end thereof. For these reasons, a distance jump occurs such that the first position P1 either comes closer to or recedes further from the own vehicle than a prescribed observation distance (i.e., an assumed observation distance) assumed when the rear end of the preceding vehicle 200 is detected in accordance with the speed of the preceding vehicle 200 relative to the own vehicle.

In this embodiment, when all of the below described three conditions are met, the ECU 20 determines that a distance jump of the first position P1 is occurring. First, an absolute value obtained by subtracting the assumed observation distance between the own vehicle and the first position P1 from an observed distance between the own vehicle and a first position P1 in a first period is a first distance difference threshold (i.e., a first distance difference determination value) or more. Secondly, an absolute value obtained by subtracting the assumed observation distance between the own vehicle and the second position P2 from an observed distance between the own vehicle and a second position P2 is less than a second distance difference threshold (i.e., a second distance difference determination value). Thirdly, an absolute value obtained by subtracting the observed distance between the own vehicle and the second position P2 from the observed distance between the own vehicle and the first position P1 is a third distance difference threshold (i.e., a third distance difference determination value) or more.

Here, each of the assumed observation distances of the first and second positions P1 and P2 is equivalent to a moving distance by which the millimeter wave target is assumed to move in the first period. Hence, each of the assumed observation distances of the first and second positions P1 and P2 can be calculated by multiplying the speed of the millimeter wave target relative to the own vehicle by the first period. Here, the first distance difference determination value is the maximum absolute value of the difference between the observed distance and the assumed observation distance in the first period assumed when the first position P1 is detected in the preceding vehicle. The second distance difference determination value is the maximum absolute value of the difference between the observed distance from the own vehicle to the second position P2 and the assumed observation distance thereof in the first period assumed when the second position P2 is detected in the preceding vehicle. The second distance difference determination value may be determined in view of an error of the second position P2. The third distance difference determination value is the maximum absolute value of the difference between the observed distances of the first position P1 and the second position P2 assumed when the first and second positions P1 and P2 are detected in the same preceding vehicle.

When the ECU 20 determines that detection of the millimeter wave target is made based on the first position P1, the ECU 20 designates calculated information (i.e., "first calculated information" hereinafter and "first detection information" in the claims) as a calculation result (i.e., "detection result" in the claims). Here, the first calculated information includes a relative speed, a relative distance, a lateral position of a millimeter wave target detected based on the first position P1, calculated relative to the own vehicle. By contrast, when the ECU 20 determines that detection of the millimeter wave target is not made based on the first position P1, the ECU 20 designates second calculated information (i.e., "second detection information" in the claims) as a calculation result of calculating the millimeter wave target, if the ECU 20 determines that the first position P1 and the second position P2 had belong to the same vehicle in the past. The second calculated information also includes a relative speed, a relative distance and a lateral position of a millimeter wave target detected based on the second position P2, calculated relative to the own vehicle. Hence, in this embodiment, the ECU 20 corresponds to a calculated information designator (i.e., "detection information designator" in the claims).

Figure 5A:
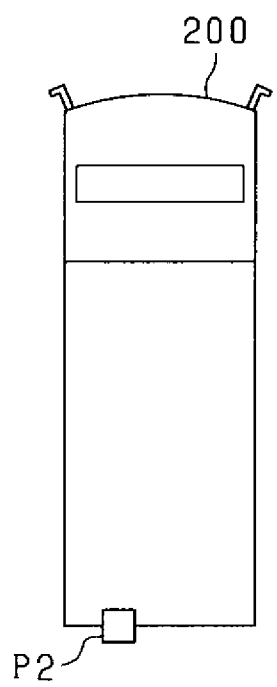
FIGS. 5A and 5B are diagrams collectively illustrating an exemplary necessary condition for cancelling designation of second calculated information according to one embodiment of the present disclosure.
Figure 5B:
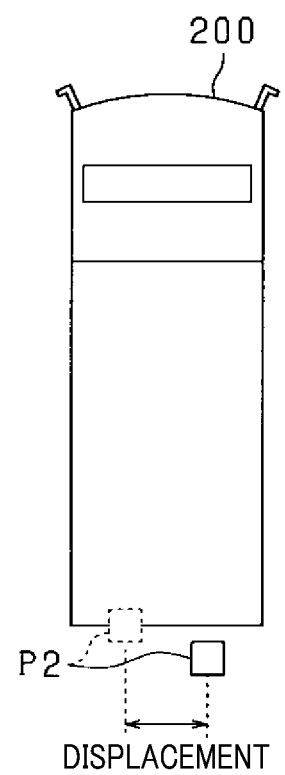

FIGS. 5A and 5B are diagrams collectively illustrating a transition of the second position P2 occurring after the second calculated information is designated as the calculation result of calculating the millimeter wave target. In the drawings, a time elapses from a time of FIG. 5A to that of FIG. 5B in this order.

Since the second position P2 includes a position, intensity of a received wave from which is weak in comparison with that from the first position P1, detection accuracy of the second position P2 may be sometimes deteriorated by an influence of noise on the second position P2 or a change in reflection position reflecting the electromagnetic wave in the preceding vehicle 200. For example, as shown in FIGS. 5A and 5B, the second position P2 located in the rear end of the preceding vehicle 200 is moved away from the rear end of the preceding vehicle 200. In view of these, the ECU 20 does not designate second calculated information as a calculation result, because the second position P2 is no longer stably detected after the second calculated information is designated as the calculation result.

Here, in ACC control, since a relative distance in an own vehicle traveling direction from the own vehicle to the preceding vehicle is controlled to match with a prescribed target vehicle distance, a change in second position P2 in the own vehicle traveling direction rarely occurs. In view of this, in this embodiment, the ECU 20 compares a change in lateral position obtained as the second calculated information with a position change determination value.

Figure 6:
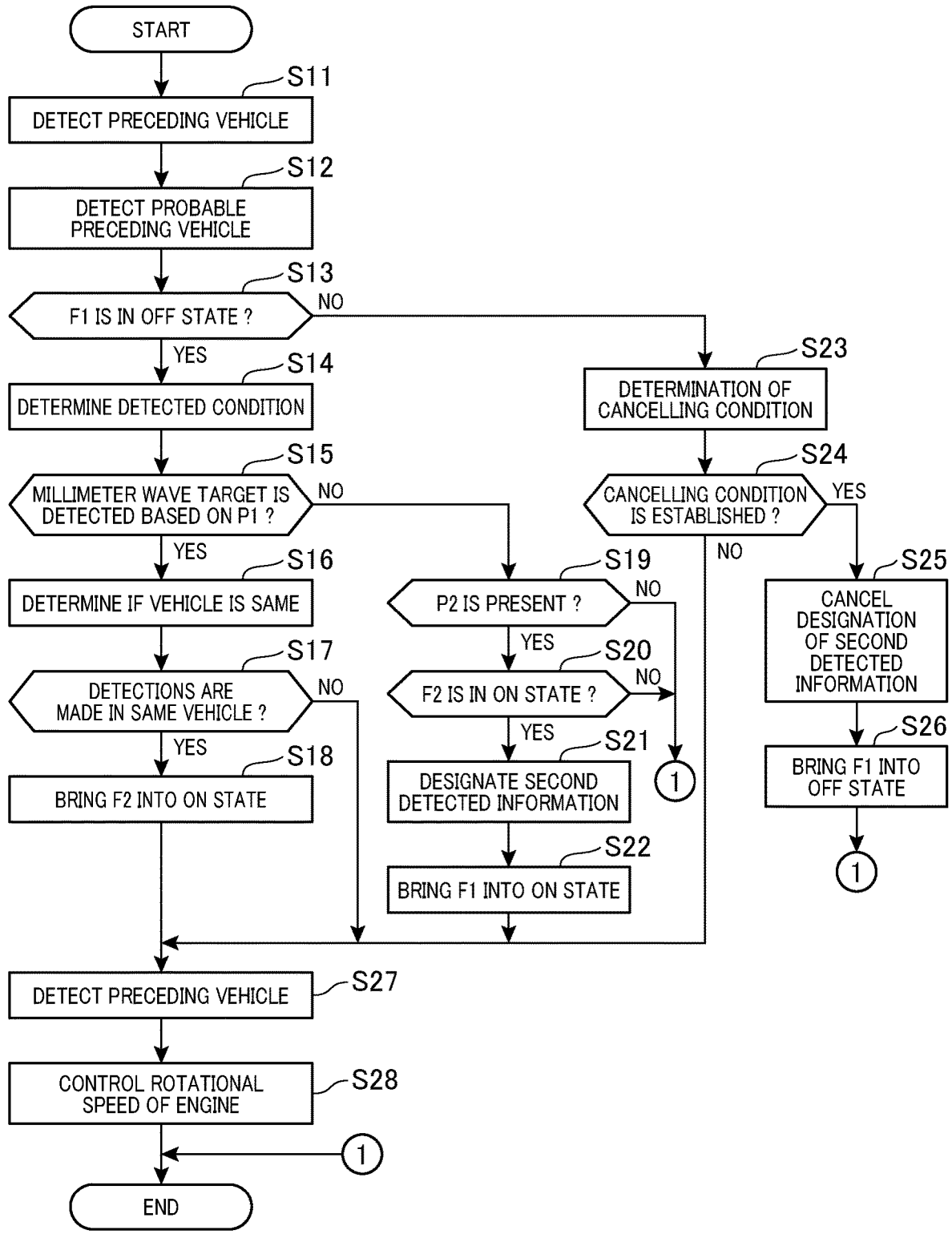
FIG. 6 is a flowchart illustrating an exemplary sequence of ACC (Adaptive Cruise Control) control executed according to one embodiment of the present disclosure.

Now, an exemplary sequence of the ACC control is described herein below with reference to FIG. 6. Here, the ACC control shown in FIG. 6 is repeatedly performed at a prescribed control cycle by the ECU 20.

First, in step S11, calculated information of multiple millimeter wave targets and calculated information of these image targets are obtained. In this embodiment, when the first position P1 and the second position P2 are detected in the millimeter wave target, the first calculated information and the second calculated information are acquired together. By contrast, when only one of the first position P1 and the second position P2 is detected, calculated information of the corresponding one of the first and second positions P1 and P2 is obtained.

In step S12, a millimeter wave target serving as a possible preceding vehicle is detected based on the calculated information of the millimeter wave target acquired in step S11. In this embodiment, when it is determined based on one of the first and second positions P1 and P2 that a millimeter wave target travels ahead of the own vehicle, the millimeter wave target is determined as a possible preceding vehicle.

In step S13, it is determined if a change flag F1 is in an OFF state. Here, the change flag F1 is in the OFF state when the first calculated information is designated as a calculation result of calculating the millimeter wave target. By contrast, the change flag F1 is in the ON state when the second calculated information is designated as a calculation result of calculating the millimeter wave target.

Hence, if the change flag F1 is in the OFF state, the process proceeds to step S14. Then, it is determined whether detection of a millimeter wave target is made based on the first position P1 (in step S15). When it is determined that the millimeter wave radar 10 is detecting the first position P1 and the distance jump of the first position P1 is not occurring, a positive determination is made in step S15. Then, the process proceeds to step S16.

In step S16, it is determined based on the above-described five conditions whether the first position P1 and the second position P2 are currently detected in the same vehicle. When the millimeter wave radar 10 detects only the first position P1, it is determined that the first position P1 and the second position P2 are not detected in the same vehicle.

Further, in step S16, same vehicle determination is executed. Hence, if the first position P1 and the second position P2 are detected in the same vehicle, a positive determination is made in step S17. Then, a vehicle determination flag F2 is brought into the ON state in step S18. That is, the vehicle determination flag F2 is brought into the ON state when it is determined the first and second positions P1 and P2 are detected in the same vehicle. By contrast, the vehicle determination flag F2 is brought into the OFF state when it is determined that the first and second positions P1 and P2 are not detected in the same vehicle. Hence, in step S17, if it is determined that the first position P1 and the second position P2 are not detected in the same vehicle, a negative determination is made. The process then proceeds to step S27. Hence, in such a situation, the vehicle determination flag F2 may be set to be an OFF state.

In step S27, a preceding vehicle is determined based on the calculation results obtained based on the millimeter wave targets and the image targets in step S11. When the process proceeds from one of steps S17 and S18 to step S27, the preceding vehicle is detected based on a fusion of the calculated information of the image target and the first calculated information of the millimeter wave target on the condition that the millimeter wave target and the image target are determined to be the same object in step S27.

Further, in step S28, to follow the preceding vehicle determined in step S27 while maintaining the target vehicle distance, an engine rotational speed is controlled. For example, a current deviation between an own vehicle speed and a target vehicle speed is calculated. Also, a current deviation between a relative distance from the own vehicle to the preceding vehicle and the target vehicle distance is calculated. Then, an acceleration of the own vehicle is adjusted to approximate each of the deviations to zero. After that, the process shown in FIG. 6 is terminated.

Further, step S14 is performed in a subsequent control cycle. Subsequently, if it is determined that detection of the millimeter wave target is not made based on the first position P1, a negative determination is made in step S15. Then, the process proceeds to step S19. In step S19, it is determined whether detection of a millimeter wave target is made based on the second position P2. If detection of the millimeter wave target is not made based on the second position P2, the process shown in FIG. 6 is terminated.

By contrast, in step S19, if detection of a millimeter wave target is made based on the second position P2 (i.e., Yes, in step 19), the process proceeds to step S20. Then, it is determined in step S20 whether the vehicle determination flag F2 is brought into the ON state. If the vehicle determination flag F2 is brought into the ON state (i.e., Yes, in step 20), the process proceeds to step S21. By contrast, when a negative determination is made in step S20, the process shown in FIG. 6 is terminated. Further, in this embodiment, when a negative determination is made in any one of steps S19 and S20, the detection of the preceding vehicle is not performed (in step S27).

Further, in step S21, the second calculated information is designated as a calculation result of calculating the millimeter wave target. In step S22, a condition of the change flag F1 is changed from the OFF state to the ON state.

In step S13 during a subsequent control cycle, when the change flag F1 is determined to be in the ON state, the process proceeds to step S23. In step S23, it is determined whether the cancelling condition for cancelling designation of the second calculated information as the calculation result is satisfied. Specifically, a difference made in a vehicle widthwise direction between respective lateral positions obtained in previous and current control cycles is compared with the position change determination value. If the change in lateral position of the second position P2 is the position change determination value or less, since the cancelling condition is not satisfied, a negative determination is made in step S24 (i.e., No, in step 24). Then, the process proceeds to step S27.

By contrast, if the change in lateral position of the second position P2 is greater than the position change determination value, a positive determination is made in step S24 (i.e., Yes, in step S24). Then, the process proceeds to step S25. In step S25, designation of the second calculated information as the calculation result is cancelled. Specifically, in this embodiment, when designation of the second calculated information of the millimeter wave target as the calculation result is cancelled, detection of the preceding vehicle executed in step S27 is not performed. Hence, in step S26, a condition of the change flag F1 is changed from the ON state to the OFF state, and the process of FIG. 6 is terminated.

Accordingly, as described heretofore, according to this embodiment, the below described various advantages can be obtained.

First, when detection of the millimeter wave target is made based on the first position P1, the ECU 20 designates the first calculated information as the calculation result. By contrast, when it determines that detection of the millimeter wave target is not made based on the first position P1, the ECU 20 designates the second calculated information of the preceding vehicle as the calculation result if the ECU 20 determines that the first position P1 and the second position had been detected in the same vehicle in the past. Hence, even when it is no longer possible to detect the millimeter wave target based on the first position P1, it is yet possible to continuously detect the millimeter wave target by designating the second calculated information thereof. As a result, erroneous detection of the preceding vehicle can be either suppressed or reduced.

Further, the ECU 20 determines that the first position P1 and the second position P2 are detected in the same vehicle when the difference in distance between the first position P1 and the second position P2 is smaller than the prescribed distance difference determination value, and the difference in speed between the first position P1 and the second position P2 is smaller than a prescribed speed difference determination value. Hence, with such a configuration, even when the reflection position is changed from the first position P1 to the second position P2 in the preceding vehicle, since the second position P2 minimizes each of the differences in speed and distance from the first position P1, adverse effect on detection of the preceding vehicle can be ether suppressed or reduced.

Further, the ECU 20 determines that detection of the rear end of the millimeter wave target is not made based on the first position P1 when the ECU 20 determines that the travelling distance of the first position P1 in the vehicle traveling direction during the first period is longer than the assumed travelling distance thereof calculated based on the relative speed of the preceding vehicle to the own vehicle. Hence, even when a vehicle such as a truck including a loading platform, etc., having a narrow reflective surface reflecting a millimeter wave is detected, detection error can be more effectively either suppressed or reduced.

Further, in this embodiment, the ECU 20 does not designate the second calculated information as the calculation result when it determines after designating the second calculated information as the calculation result that a change in second position P2 caused during the second period is greater than the position change determination value. Hence, a position of the preceding vehicle can be accurately detected continuously after the calculation result obtained by detecting the millimeter wave target is changed from the first calculated information to the second calculated information.

Now, a modification of the first embodiment of the present disclosure will be described. First, the determination that the distance jump of the first position P1 occurs may not satisfy all of the above-described three conditions. That is, the ECU 20 can determine if the distance jump has occurred based only on a condition that the absolute value obtained by subtracting the assumed observation distance between the own vehicle and the first position P1 from the observed distance between the own vehicle and the first position P1 is the first distance difference determination value or more during the first period.

Further, after designating the second calculated information as the calculation result, the ECU 20 can cancel designation of the second calculated information when it determines that the change in speed of the second position P2 during the third period is greater than a prescribed speed change determination value. Here, the third period may be the same as the second period, because it is a control cycle when the ECU 20 acquires the second position P2 of the preceding vehicle detected by the millimeter wave radar 10. The speed change determination value is the maximum amount of displacement of the second position P2 assumed when the second position P2 is detected in the same vehicle during the third period.

Further, if first calculated information can be detected after designation of the second calculated information acting as the calculation result of the millimeter wave target is cancelled, the first calculated information may be designated as the calculation result. In such a situation, detection of the preceding vehicle and the same object determination can be performed in step S27 of FIG. 6 based on the newly designated first calculated information in this modification.

Now, a second embodiment of the present disclosure is described herein below with reference to FIGS. 7A and 7B. In the second embodiment, only configuration different from the first embodiment is mainly described.

Specifically, when this embodiment is compared with the first embodiment, cancelling conditions for cancelling designation of the second calculated information as the calculation result obtained by detecting the millimeter wave target are different as described herein below.

Specifically, in FIG. 7A, the rear end of the preceding vehicle 200 is detected based on the second position P2 near the first position P1. However, as shown in FIG. 7B, the second position P2 is moved away from the first position P1 after a prescribed time has elapsed. In such a situation, the preceding vehicle may be improperly detected due to the separation of the second position P2.

In view of this, according to this embodiment, when the below described conditions are satisfied, designation of the second calculated information as the calculation result is cancelled. First, after the millimeter wave target is detected and the second calculated information is designated as the calculation result, a difference in distance between the first position P1, which belongs to the same vehicle as the second position P2 and has been used in the past to detect the millimeter wave target, and the second position P2 is greater than a prescribed distance change determination value. Here, in this embodiment, the ECU 20 stores data of the first position P1 previously used for detecting the millimeter wave target as a comparison objective and compares it with the second position P2. Further, when a new first position P1 is detected by the millimeter wave radar 10, the new first position P1 can be compared with the second position P2 as well.

Here, the distance change determination value is the maximum value of a difference in distance between the first position P1 and the second position P2 assumed when the first and second positions P1 and P2 are detected in the same vehicle. Further, in ACC control, a change in second position P2 in the own vehicle traveling direction is less likely to occur, because a distance from the own vehicle to the preceding vehicle in the vehicle traveling direction is controlled to be a prescribed target vehicle distance. Hence, in this embodiment, the ECU 20 may compare a difference in distance in a vehicle widthwise direction between a lateral position corresponding to the first position P1 and that of the second position P2 with a distance change determination value.

Specifically, when it determines if the conditions employed in this embodiment are satisfied in step S23 of FIG. 6. Then, if the ECU 20 determines that the cancelling conditions for cancelling designation of the second calculated information as the calculation result are satisfied, a positive determination is made (i.e., Yes, in step S24). Then, the process may proceed to step S25.

As described heretofore, according to this embodiment, the same advantages can be similarly obtained as obtained in the first embodiment.

Now, a modification of the second embodiment is herein below described. Specifically, when the below described conditions are satisfied, the ECU 20 may remove a position of the preceding vehicle from the second position P2. First, after an observation position of the preceding vehicle is changed from the first position P1 to the second position P2, a difference in speed between the second position P2 and the first position P1 detected in the same vehicle to which the second position P2 belongs in the past is greater than a prescribed speed change determination value.

Here, the speed change determination value is the maximum value of a difference in speed between the first position P1 and the second position P2 assumed when the first and the second position P1 and P2 are detected in the same vehicle.

As described heretofore, also according to this embodiment, the same advantages can be similarly obtained again as obtained in the first embodiment.

Now, a third embodiment of the present disclosure is described herein below with reference to FIG. 8. However, only a configuration and/or operation of the third embodiment different from the first embodiment is mainly described.

As shown in FIG. 8, an exemplary sequence of ACC control according to this embodiment is illustrated. That is, the ACC control is repeated in a prescribed control cycle by the ECU 20.

When a negative determination is made in step S15 (i.e., No, in step S15), the process proceeds to step S19. When positive determinations are made in both steps S19 and S20, the process proceeds to step S30. In step S30, it is determined whether a change in lateral position of the second position P2 in the vehicle widthwise direction during the second period is greater than the position change determination value. Here, determination performed in step S30 is substantially the same as the determination performed in step S23 of the first embodiment. If the change in lateral position of the second position P2 in the vehicle widthwise direction during the second period is less than the position change determination value, a negative determination is made in step S31, and the process proceeds to step S21. In step S21, the second calculated information of the preceding vehicle is designated as a calculation result of calculating the millimeter wave target. By contrast, if the change in lateral position of the second position P2 in the vehicle widthwise direction during the second period is greater than the position change determination value, a positive determination is made in step S31, and the process of FIG. 8 is terminated. Hence, in such a situation, designation of the second calculated information as the calculation result is cancelled.

Further, the determination performed in step S30 can be any one of the determinations performed in respective steps S23 and S24 in the second embodiment and the modification thereof.

Hence, as described heretofore, according to this embodiment, the same advantages can be similarly obtained again as obtained in the first embodiment.

Now, yet other embodiments are described herein below. First, the ECU 20 can perform collision mitigation control as drive assistance control instead of the ACC in order to reduce collision shock caused between the own vehicle and other vehicles located around the own vehicle. Hence, in such a situation, the ECU 20 only needs to increase a braking force of the brake system when it determines based on positions of the other vehicles around the own vehicle that the own vehicle and the other vehicle are likely to collide with each other.

Further, a control device can be mounted on either the millimeter wave radar 10 or the image sensor 11 and performs the one and same object determination as executed in the above-described various embodiments and modifications. Hence, in such a situation, the control device provided in one of the millimeter wave radar 10 and the image sensor 11 is only needed to function as the above-described ECU 20.

Further, the ECU 20 can detect the preceding vehicle based only on the millimeter wave target instead of the fusion target.

Further, the drive assistance system 100 can employ a laser radar in place of the millimeter wave radar.

The above-described various control devices and methods can be performed by a dedicated computer composed of a processor programed by computer program to perform one or more functions specified by the computer program and a memory storing various data. Otherwise, the above-described various control devices and methods can be performed by a dedicated computer including a processor composed of at least one dedicated hardware logical circuits. Alternatively, the above-described various control devices and methods can be performed by one or more dedicated computers each prepared by combining a processor programed by computer program to perform one or more functions, a memory storing various data, and another processor composed of one or more hardware logical circuits. Further, the computer program can be stored in a computer readable non-transition tangible recording medium as an instruction to be performed by the computer.

Numerous additional modifications and variations of the present disclosure are possible in light of the above teachings. It is therefore to be understood that within the scope of the appended claims, the present disclosure may be executed otherwise than as specifically described herein. For example, the present disclosure is not limited to the above-described vehicle detection system and may be altered as appropriate. Further, the present disclosure is not limited to the above-described method of detecting a preceding vehicle and may be altered as appropriate.

What is claimed is:

1. A vehicle detection system for detecting a preceding vehicle traveling ahead of an own vehicle, the vehicle detection system comprising:
    an electromagnetic wave sensor configured to detect various objects including one or more preceding vehicles, the electromagnetic wave sensor configured to detect a first position and a second position in the same or different objects,
        the first position having a higher reliability as a position to be observed in an object,
        the second position having a lower reliability than the first position as a position to be observed in the object;
    a same vehicle determiner configured to determine whether the first position and the second position are included in a same preceding vehicle;
    a first position detection determiner configured to determine whether detection of the preceding vehicle is made based on the first position;
    a detection information designator configured to designate, as a detection result, first detection information in response to a determination of the first position detection determiner that detection of the preceding vehicle is currently made based on the first position in a current control cycle of an automatic cruise control performed by an ECU, in which the ECU performs multiple control cycles, the first detection information calculated relative to the own vehicle and utilized by the same vehicle determiner, the first detection information including at least one of a relative speed, a relative distance and a lateral position of a preceding vehicle detected based on the first position, and
    the detection information designator configured to designate, as the detection result, second detection information in response to a determination of the first position detection determiner that detection of the preceding vehicle is currently not made based on the first position in the current control cycle of the automatic cruise control, and that the first position and the second position were previously detected in the same preceding vehicle during a previous control cycle of the automatic cruise control, the second detection information including at least one of a relative speed, a relative distance and a lateral position of the preceding vehicle detected based on the second position, the second detection information being calculated relative to the own vehicle and utilized by the same vehicle determiner; and
    a vehicle controller configured to control a speed of the own vehicle to follow the preceding vehicle while maintaining a target vehicle distance based on the detection result designated by the detection information designator.

2. The vehicle detection system as claimed in claim 1, wherein the same vehicle determiner determines that the first position and the second position are detected in the same preceding vehicle at least any one of when a difference in distance between the first position and the second position is smaller than a prescribed distance difference determination value and when a difference in speed between the first position and the second position is smaller than a prescribed speed difference determination value.

3. The vehicle detection system as claimed in claim 1, wherein the electromagnetic wave sensor detects a position as the first position when it causes a reflected wave to have a higher intensity than a first threshold value, the first threshold value being higher than a second threshold value referred to when a position is detected as the second position,
    wherein the first position detection determiner determines that detection of a rear end of the preceding vehicle is not made based on the first position when an amount of movement of the first position of the preceding vehicle in a vehicle traveling direction during a first period is determined to be longer than an assumed amount of movement of the first position calculated based on a relative speed of the preceding vehicle to the own vehicle.

4. The vehicle detection system as claimed in claim 1, wherein the first position detection determiner determines that the detection of the preceding vehicle is not made based on the first position when the electromagnetic wave sensor does not detect the first position.

5. The vehicle detection system as claimed in claim 1, wherein the detection information designator does not designate the second detection information as the detection result when it determines that a change in second position detected with the first position in the same preceding vehicle from a previous control cycle to a current control cycle is greater than a prescribed position change determination value and when it determines that a change in speed of the second position detected with the first position in the same preceding vehicle from a previous control cycle to a current control cycles is greater than a prescribed speed change determination value.

6. The vehicle detection system as claimed in claim 1, wherein the detection information designator does not designate the second detection information as the detection result when it determines that a distance between the first position and the second position detected in the same preceding vehicle is greater than a prescribed distance change determination value.

7. The vehicle detection system as claimed in claim 1, wherein the detection information designator does not designate the second detection information as the detection result when it determines that a difference in speed between the first position and the second position detected in the same preceding vehicle is greater than a prescribed speed difference determination value.

8. A method of detecting a preceding vehicle traveling ahead of an own vehicle, the method comprising:

detecting various objects including one or more preceding vehicles;

detecting a first position and a second position in the same or different objects,
- the first position having a higher reliability as a position to be observed in an object, and
- the second position having a lower reliability than the first position as a position to be observed in the object;

determining whether the first position and the second position are included in a same preceding vehicle;

determining whether detection of the preceding vehicle is made based on the first position;

designating, as a detection result, first detection information in response to a determination that detection of the preceding vehicle is currently made based on the first position in a current control cycle of an automatic cruise control performed by an ECU, in which the ECU performs multiple control cycles, the first detection information calculated relative to the own vehicle, the first detection information including at least one of a relative speed, a relative distance and a lateral position of a preceding vehicle detected based on the first position;

designating, as the detection result, second detection information in response to a determination that detection of the preceding vehicle is currently not made based on the first position in the current control cycle of the automatic cruise control and that the first position and the second position were previously detected in the same preceding vehicle during a previous control cycle of the automatic cruise control, the second detection information including at least one of a relative speed, a relative distance and a lateral position of the preceding vehicle detected based on the second position, the second detection information being calculated relative to the own vehicle; and controlling a speed of the own vehicle to follow the preceding vehicle while maintaining a target vehicle distance based on the detection result.

* * * * *